July 18, 1933.  B. H. WITHERSPOON  1,918,679

MIXING DEVICE

Filed May 13, 1931  2 Sheets-Sheet 1

INVENTOR
Burton H. Witherspoon
by his attorneys
Byrnes, Stebbins,
Parmelee & Blenko July 18, 1933. B. H. WITHERSPOON 1,918,679
MIXING DEVICE
Filed May 13, 1931   2 Sheets-Sheet 2
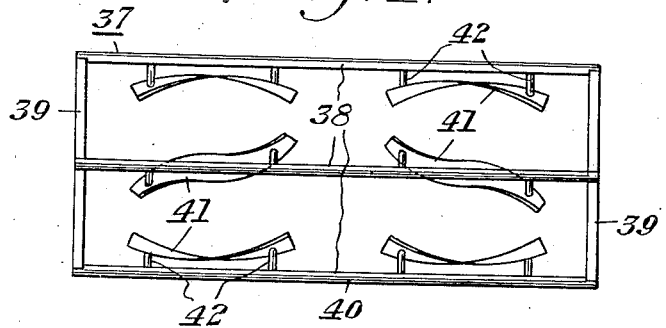
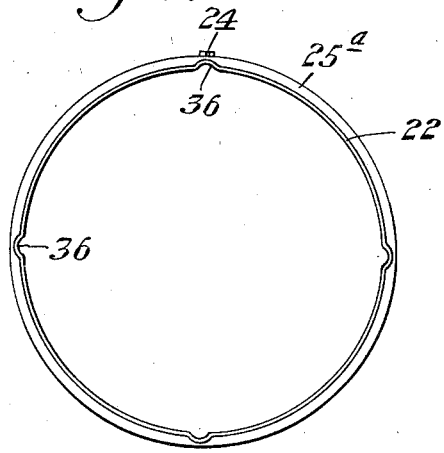 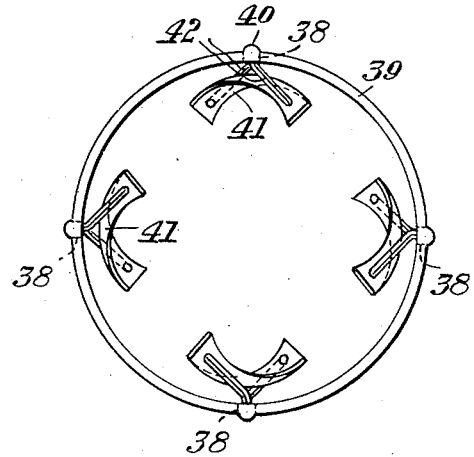
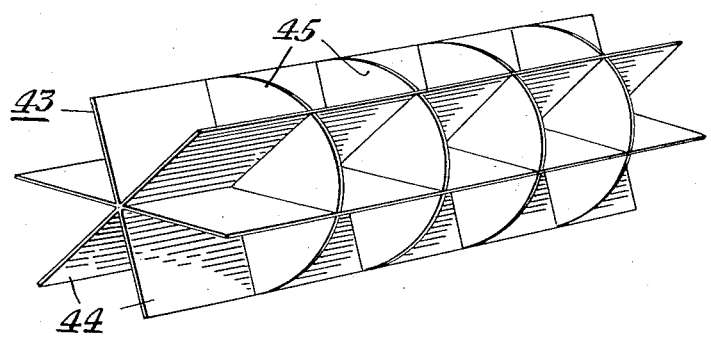

Patented July 18, 1933

1,918,679

UNITED STATES PATENT OFFICE

BURTON H. WITHERSPOON, OF PITTSBURGH, PENNSYLVANIA

MIXING DEVICE

Application filed May 13, 1931. Serial No. 537,001.

My invention relates, in general, to an apparatus for mixing or agitating and, in particular, to a device of this character adapted for use in connection with the standard types of mechanical refrigerating units for domestic service.

Although domestic refrigerating units have been perfected to a high degree, certain objections to their use for some purposes still exist. In the matter of freezing ice cream or other similar desserts, whether they are first partly frozen in the ordinary freezer or whether the whole process is carried on in the refrigerator, it is found necessary to remove the freezing trays from the refrigerator and stir the mixture periodically during the freezing operation, in order that the desired smoothness of texture characterize the final product. Without this stirring, the product is lumpy and grainy. This condition is, obviously, very undesirable, since it requires the presence of some person to do the necessary stirring at the required intervals.

I have invented a means for effecting a continuous mixing, stirring or agitation of a batch of material inserted in the freezing chamber of a domestic refrigerator for cooling or complete freezing. This invention makes it unnecessary for the mixture being cooled or frozen to be stirred manually, and thus relieves the user of the refrigerator from the care and annoyance of having to attend to the mixture while it is freezing.

While my invention has particular reference to the mixing of material in a freezing or cooling chamber of a refrigerator, in its broader aspects the invention contemplates the provision of a novel type of mixer which has numerous applications entirely aside from its use in connection with the cooling chamber of a refrigerator.

According to the invention, I provide means for rotatably supporting a cylindrical container with its axis substantially horizontal. The container is provided with a removable imperforate closure for one end thereof. The supporting means comprises a frame and a pair of shafts provided with supporting and driving rollers adapted to engage the cylindrical container externally. The rollers are adapted to be driven by an electric, spring or other type of motor, and suitable driving connections between the motor and the rollers are included.

When the invention is to be employed in the freezing chamber of a domestic refrigerator, I preferably mount the driving motor inside the refrigerator and dispose the motor control switches externally thereof. The switches may provide for variable speed operation of the motor, if desired. In order to effect the necessary agitation of a mixture to be frozen, I provide the cylindrical container with a cage having spirally disposed paddles or blades secured thereto. The cage is adapted to be inserted in the container and the engagement is such as to prevent relative rotation. When the container is driven, therefore, the paddles rotate therewith. The mixture to be frozen tends to remain stationary and is agitated or stirred by the passage of the paddles therethrough. For certain purposes, the container need not be driven at a speed such as to produce a spinning of the mixture therein, although this is not objectionable for other uses of the device. In freezing ice cream, for example, it is desirable to effect continuous movement of the paddles through the mixture.

I also provide the cylindrical container with a mold for freezing ice when the device is not employed for freezing ice cream or other similar products.

For a more complete understanding of the invention, reference is made to the accompanying drawings illustrating the present preferred embodiment of the invention. It is to be understood, of course, that the details illustrated in the drawings and described hereinafter may be altered within wide limits, without departing from the spirit of the invention.

In the drawings,

Figure 3 is an end view of the container for receiving the mixture to be frozen;

Figure 4 is a side elevation of the paddle-supporting cage adapted to be inserted in the container;

Figure 5 is an end view of the cage shown in Figure 4; and

Figure 6 is a perspective view of an ice mold suited for use in the container, when it is desired to make ice therein.

Figure 1:
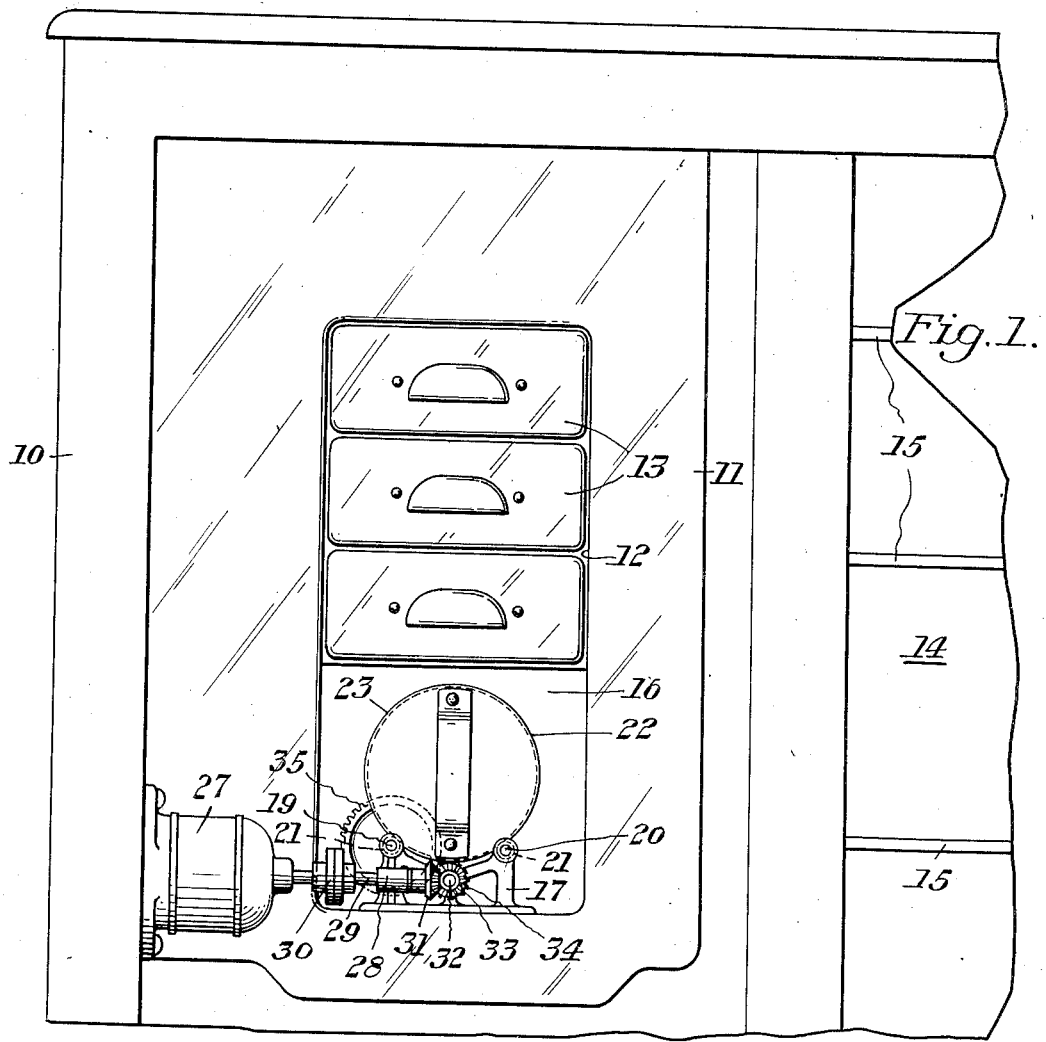
Figure 1 is a front elevational view, partly broken away, showing the freezing chamber of a domestic refrigerating unit, having the invention embodied therein.
Figure 2:
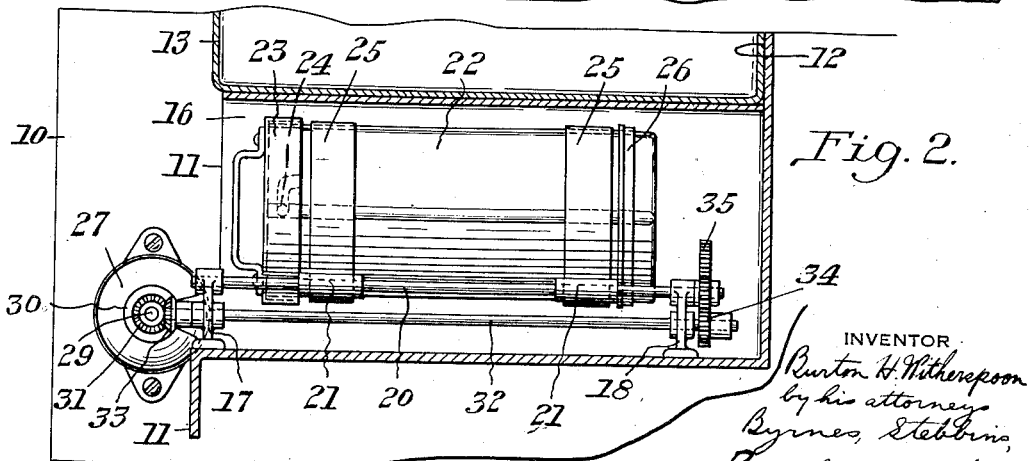
Figure 2 is a central sectional view through a portion of the freezing chamber, showing parts in elevation.

Referring in detail to the drawings, the usual design of domestic refrigerating unit comprises an insulating casing 10, wherein is located a freezing chamber defined by a refrigerant coil (not shown). Generally, the coil is concealed by a face plate or shield 11 having an opening 12 therein, for the reception of trays 13, which slide into compartments formed within the freezing chamber. The interior of the refrigerator, indicated at 14, is provided with storage shelves 15.

In the refrigerator illustrated, having the invention embodied therein, a freezing compartment 16 is provided within the refrigerant coil, preferably below the trays 13. On the floor of the compartment 16, adjacent the front and rear ends thereof, bearings brackets 17 and 18 are mounted. The brackets 17 and 18 provide bearings for a pair of shafts 19 and 20 which are provided with rollers 21 of rubber or other material adapted to give good frictional engagement with smooth metallic surfaces.

A cylindrical receptacle or container 22 is supported on the rollers 21 with its axis in the horizontal plane. The container 22 has an open end which is adapted to be closed by a removable cover 23 having a bayonet lock 24. It is to be noted that the cover 23 is entirely without any holes, so that fluid mixtures may be retained in the container 22, even though the latter is disposed horizontally. If desired, of course, a gasket may be employed between the end of the container 22 and the cover 23. For reasons which will appear hereinafter, I prefer to employ circumferential bands 25 on the container 22, which are adapted to engage the rollers 21 and an additional band 25a (see Fig. 3). A guard ring 26 may also prove useful to prevent horizontal displacement of the container 22 toward the front of the compartment 16 on rotation of the container. A similar guard ring may be employed to prevent rearward displacement of the container, or the flange on the cover 23 engaging the rollers 21 may be sufficient for this purpose.

The shaft 19 is driven by a small electric motor 27 mounted inside the refrigerator, just forward of the freezing chamber. Preferably, the motor is of the type adapted for flush mounting on the refrigerator side wall, and motors of other types than electrical may be used. The front bearing bracket 17 carries a boss 28, which provides a bearing for a transverse shaft 29. A coupling 30 connects the shaft of the motor 27 to the shaft 29. The latter shaft carries a bevel gear 31. A longitudinal drive shaft 32 is also journalled in the bearing brackets 17 and 18 and carries at its forward end a bevel gear 33 meshing with the bevel gear 31. At its rear end, the drive shaft 32 is provided with a pinion 34. The pinion 34 meshes with a gear 35 secured to the shaft 19.

The motor 27 thus serves to drive the container 22 at a low rate of speed through the shafts and gearing described in detail above. The shafts and gearing act as a speed reducer, so that the actual speed of the container 22 is only a fraction of that of the motor 27. Obviously, it may be desirable to provide speed changing means for the container 22, either in the form of a speed change gear or by the use of a variable speed motor. In either case, suitable control mechanism may be employed to actuate the speed changing means. When freezing ice cream, it will be desirable to drive the container 22 at a relatively low rate of speed, so that the mixture to be frozen is merely gently stirred or agitated. When used for certain other purposes, it may be desirable to drive the container at a higher rate of speed.

Referring now in particular to Figures 3 through 5, it will be noted that the container 22 is provided with axial grooves or channels 36, pressed outwardly from the peripheral wall thereof. The bands 25 and 25a are recessed to accommodate the out-pressed grooves or beads 36 and fit snugly around the container at all points on its circumference. The bands 25 and 25a provide true cylindrical engaging portions for the rollers 21 and the cover 23. Without these bands, the grooves 36 might interfere with the turning of the container or the application of the cover thereto. Obviously, other equivalents of the grooves 36, for the purposes about to be described, may be resorted to. For example, a single groove in the beads usually formed at the ends of a cylindrical metal container may be used. In such cases, the bands 25 and 25a will not be necessary.

The means for agitating or stirring the contents of the receptacle 22 comprises a cage 37 composed of metallic rods 38 extending between end rings 39 and secured thereto. The outer sides of the rods 38 project outwardly beyond the circumference of the rings 39, as shown at 40. These projections are adapted to enter the grooves 36 in the container 22, so that the cage will thereby be secured against rotation relative to the container. Instead of the rods 38, flat strips may be used.

The cage 37 is provided with a plurality of spirally disposed mixing blades 41. These blades are supported from the rods 38 on arms 42. As will be apparent from Figure 4, there are two sets of blades spaced along the length of the cage 37. The blades of each set are oppositely disposed relative to the corresponding blade of the opposite set. The driving mechanism for the container 22 is arranged so as to turn the latter in a predetermined direction, and the blades 41 of the cage 37, when rotated in such direction, are effective to turn and mix the material within the container. In the freezing of ice cream, the blades 41 serve merely as stirring paddles during the first stage, when the mixture to be frozen is quite fluid. As the freezing progresses, the mixture tends to solidify and at this stage, the blades tend to lift and turn the partially frozen material. By disposing the blades in the two grooves in opposite directions, relative to each other, their combined effect is to lift and turn the material while moving it horizontal from the ends of the container toward the middle thereof. As the material piles up at the middle of the container, of course, it is returned to the ends of the container by gravity. As the material hardens further, it turns with the container. The cage should then be removed and the freezing completed without further rotation of the container.

The invention herein described will, obviously, not be used at all times for the making of ice cream or the like, and I, therefore, provide means for utilizing the container 22 as an ice mold, when not being used for the other purposes mentioned. In order to freeze ice blocks of convenient sizes and shape, I employ a form 43 adapted to be inserted in the container 22. When the form has been inserted, the container may be filled with water and placed in position on the supporting rollers 21. Obviously, it is not necessary to rotate the container 22 when freezing ice. The form 43 consists of longitudinal partitions 44 and transverse partitions 45. This shape of form provides ice blocks having the shaft of segments of a cylinder.

In order to hasten the freezing operation in the container 22, it may be desirable to provide a cover for the compartment 16 having a suitable opening for the entrance of the drive shaft 32.

It will be apparent from the foregoing description that the invention provides not only a means for insuring continuous stirring or agitation of a mixture to be frozen, such as ice cream, but also has uses independent of the freezing chamber of a refrigerator. The device may be employed for any of the mixing operations necessary in the culinary art, either within the refrigerator or outside thereof. The entire structure may, therefore, be removably mounted within the compartment 16, instead of being permanently secured thereto. Such modifications, however, as well as a wide field of uses for the invention will probably be apparent without specific enumeration.

Although I have described but a single present preferred embodiment of the invention, many changes in the details of construction and arrangement may be made within the scope of the appended claims. While certain of the claims recite freezing apparatus for making ice cream, it is obvious that apparatus for making other similar preparations is contemplated by the terms of the claims.

I claim:

1. The combination with the freezing chamber of a domestic refrigerator, of substantially parallel shafts journaled therein, a cylindrical container removably supported thereon for rotation, a motor for driving at least one of said shafts, agitating means within said container for rotation therewith, and a removable, imperforate cover on at least one end of the container.

2. In a domestic refrigerator, a freezing chamber, a pair of substantially parallel shafts journaled therein, a cylindrical container removably supported thereon for rotation, a motor external to said chamber, and driving connections for said shafts, said container having a removable end cover and a set of blades therein adapted to rotate with the container for agitating the contents.

3. The combination with a domestic refrigerator having a freezing chamber therein, of a pair of parallel, rotatable supports positioned in said chamber, a cylindrical container resting on said supports for rotation, means for driving one of said supports, stirring means in said container, and an openable lid on one end of the container.

4. The combination with a domestic refrigerator having a freezing chamber therein, of a pair of parallel, rotatable supports positioned in said chamber, a cylindrical container resting on said supports for rotation, means for driving one of said supports, stirring means in said container, a filling opening in said container, and an imperforate cover for said opening.

BURTON H. WITHERSPOON.